Patented May 14, 1935

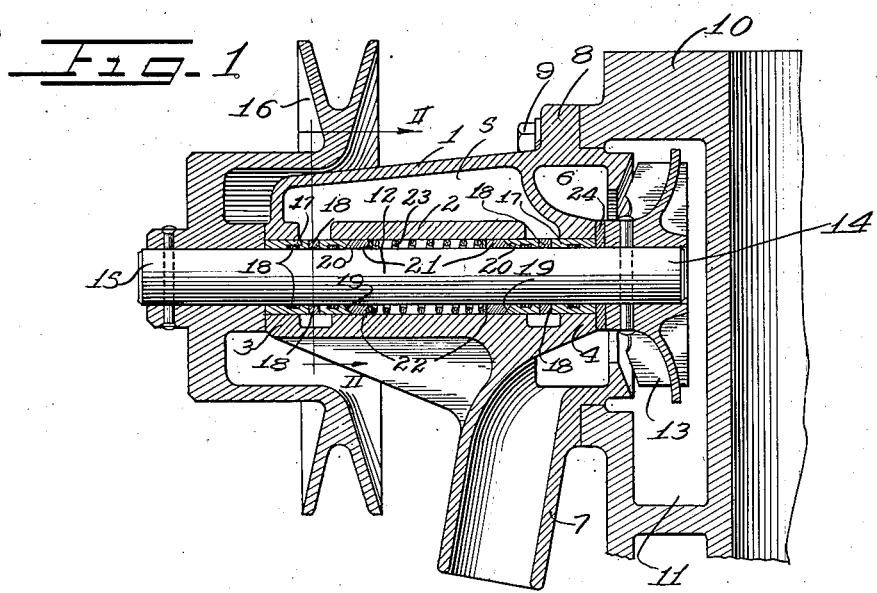
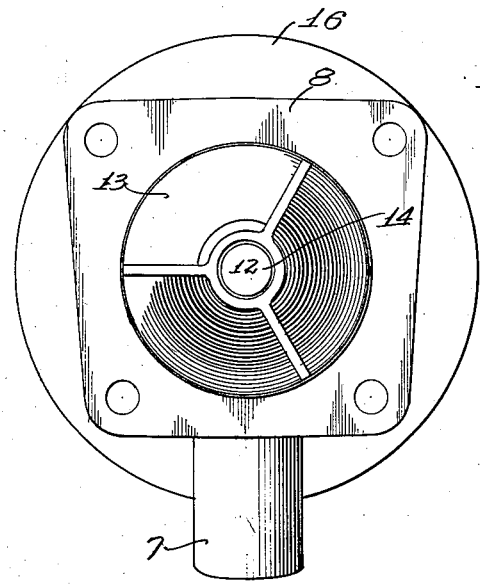
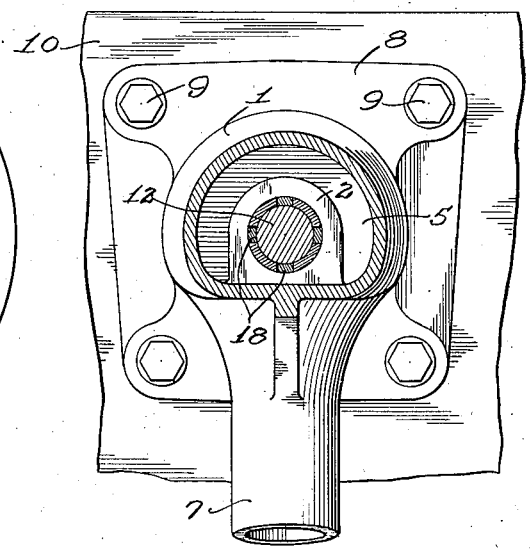

2,001,369

UNITED STATES PATENT OFFICE 2,001,369

CIRCULATING PUMP

Carl A. Ruesenberg, Rockford, Ill., assignor, by mesne assignments, to Borg-Warner Corporation, Chicago, Ill., a corporation of Illinois Application May 4, 1931, Serial No. 534,803

10 Claims. (Cl. 103—111)

The present invention relates to a pump, and while I have shown herein for illustrative purposes a pump embodying my invention applied to the cooling system of an internal-combustion engine, it will be obvious that pumps embodying my invention are applicable to a wide variety of uses.

One of the important objects of this invention is to provide an efficient driving mechanism for a pump, together with means for automatically lubricating the pump shaft.

Another object of the invention is to provide a self-lubricating and self-adjusting pump operating structure of such character that manual adjustment is dispensed with.

A further object of the invention resides in the provision of pump structure of the character described which involves no difficult machine work in the production of the parts and whose constituent parts may be very readily assembled.

It is a further object of this invention to provide means for controlling the flow of lubricant for the shaft of a pump substantially in proportion to the amount of lubricant required.

According to the general features of the invention, a pump casing is connected with the water outlet of an engine or motor casing, the pump casing being provided with an integral housing through which the impeller shaft passes, the inner end of the shaft carrying an impeller and the outer end of the shaft carrying a fan belt or other pulley or gear. The pump casing is provided with a lubricant reservoir, and self-adjusting packing means for the shaft is provided. Packing employed adjacent the impeller end of the shaft prevents entry of water into the reservoir and to the end bearing of the shaft, and special bearing elements provide means by which access of the lubricant is permitted to the shaft bearings. A semi-solid lubricant, such as petroleum jelly, grease or the like is preferably employed, said elements being of such construction as to permit the passage of the lubricant therethrough by capillary attraction.

Other objects and advantages of the invention will appear more fully from the following description and from the accompanying drawing, in which similar characters of reference indicate similar parts throughout the several views:

Figure 1 is a fragmentary sectional view showing the improved pump construction.

Figure 2 is a fragmentary sectional view taken approximately in the plane indicated by the line II—II of Figure 1.

Figure 3 is an end elevational view of the pump structure, looking from right to left in Figure 1.

In accordance with the principles of the present invention, the structure chosen to illustrate the same comprises a pump casing 1 provided with an integral bushing 2 and having its ends 3 and 4 bored on the same diameter as the bushing 2. The casing 1 is formed to provide a lubricant chamber or reservoir 5 and a circulating chamber 6, and a fluid outlet tube 7 communicates with the chamber 6 and is adapted to be connected to the bottom of a radiator, not shown. The casing 1 is suitably flanged at 8 and bolted at 9 to the forward end of an engine or motor casing 10, the water outlet 11 of which communicates with the chamber 6 and tube 7 of the pump casing 1.

A pump shaft 12 is located concentrically within the pump casing ends 3 and 4 and the housing 2 and projects beyond the ends of the casing, an impeller 13 being keyed to the rear projecting end 14 of the pump shaft 12 and extending into the engine casing outlet 11. The forward projecting end 15 of the pump shaft 12 has keyed thereto a fan belt pulley or the like 16, and is adapted to be operated in conjunction with the fan, although the same may be operated from any other desired source of power.

Bearing bushings 17 bridge the gaps between the housing 2 and the pump casing ends 3 and 4, and serve to space these parts from the pump shaft 12. Each bushing 17 has embedded therein substantially continuous bearing material 18 comprising a graphite composition by which lubricant is transferred from the lubricant reservoir 5 to the portions of the pump shaft enclosed by the bushings 17, by capillary attraction. It will be noted that certain of the portions 18 are located intermediate the ends of the respective bushings 17, and are at all times in communication with the lubricant in the chamber 5.

The inner surfaces 19 of the bushings 17 are beveled, and these surfaces cooperate with the beveled surfaces 20 of packing rings 21. Suitable washers 22 engaging the opposite end surfaces of the packing rings 21 are in turn engaged by the ends of a compressed spring 23, which serves to tightly press the packing rings 21 against the adjacent ends of the bushings 17. The bushings 17 are maintained in position by the spring 23 and by the members carried on the projecting ends of the shaft. The packing rings 21 cooperate with the adjacent ends of the bearing bushings 17 to compensate for wear of the portions of the shaft and the cooperating surfaces of the bearing bushings.

In order to insure against access of water to the bearing surfaces of the shaft and bushings 17, a packing ring 24 is located between the impeller 13 and the pump casing end 4 and the associated end of the rear bushing 17. The spring 23 exerts constant pressure on the packing ring 24 to prevent access of the pumped water to the bearing surfaces, the packing ring 24 being preferably initially positioned with a fairly tight fit without interfering with the proper rotation of the impeller 13.

While any suitable lubricant may be employed in connection with the pump construction embodying the principles of this invention, a semi-solid lubricant is preferably employed. With lubricant of this character, it will be appreciated that its rate of flow through the graphite composition material 18, which, as aforesaid, transfers the lubricant by capillary attraction to the bearing surfaces, will obviously increase with the fluidity of the lubricant, and the fluidity will obviously increase with the temperature of the adjacent parts. Inasmuch as a certain amount of heat will be generated by the journaled portions of the shaft 12, it will be apparent that such portions of the shaft will be adequately lubricated at all times and that the quantity of lubricant supplied will increase in accordance with the requirements of the shaft. When the engine is not running, the lubricant within the bushing 17 assumes the semi-solid character of the remainder of the lubricant and thus serves additionally to prevent leakage of lubricant and access of the water to the lubricated surfaces.

It is a very simple matter to assemble the pump structure. After the impeller 13 is keyed to the end 14 of the shaft 12, the packing ring 24 is placed around the shaft adjacent the impeller 13, and then the rear bushing 17, the rear packing ring 21 and associated washer 22 are placed about the shaft 12 adjacent the packing ring 24. With the parts thus arranged on the shaft, the forward end of the shaft is passed forwardly through the opening defined by the ends 3 and 4 and the housing 2 of the pump casing 1, until the packing ring 24 abuts the rear end 4 of the casing 1. With the shaft thus centered in said openings, the spring 23, the forward washer 22, packing ring 21 and bushings 17 are inserted about the shaft and within the housing 2 and forward end 3 of the casing 1, whereupon the pulley 16 is keyed to the forwardly projecting portion 15 of the shaft 12. Due to this method of assembly, the spring and packings do not rotate with the shaft, thus assuring a better seal and a longer life of the packing. Obviously, the parts are susceptible of other simple modes of assembly. Thus it is apparent that it is a matter of but a few moments to assemble the pump. Once the pump is assembled, it is complete in itself and is simply fastened to the forward end 10 of the motor casing by means of the bolts 9 passing through the flange 8.

It will be clear from the foregoing that no complicated parts are required and that the parts are few in number so that the cost of manufacture is extremely low. Further than this, the pump requires no adjustment after assembly and is highly efficient in preventing leakage of either lubricant or the fluid transferred thereby.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A circulating pump in a cooling water system, said pump comprising a casing with cylindrical end sections, a shaft housing spaced from and aligned with said end sections, bushings in said end sections and bridging the spaces between the same and said housing, a compressed spring in said housing, packing means in said housing between the spring and said bushings, means for retaining said bushings in said sections, a shaft in said sections and housing and journaled in said bushings whereby said casing is rendered substantially fluid-tight, a semi-solid lubricant carried in said casing, and means for feeding said lubricant to the journaled portions of the shaft in proportion to the requirements of said portions.

2. A circulating pump for connection in a cooling water system, said pump comprising a casing having cylindrical end sections, a shaft housing spaced from and aligned with said sections, bearing bushings in said end sections and bridging the spaces between the same and said housing, a compressed spring in said housing, packing means in said housing between the spring and said bushings, means for retaining said bushings in said sections, a shaft in said sections and housing and journaled in said bushings whereby said casing is rendered substantially fluid-tight, a semi-solid lubricant carried by said casing, and automatic means for feeding said lubricant to the journaled portions of the shaft in proportion to the requirements of said portions.

3. A pump casing having a lubricant reservoir, a shaft in said casing, bearings for said shaft at the ends of said reservoir, and means including a shaft housing cooperating with said bearings to completely enclose the shaft from the reservoir between the ends of the reservoir, said bearings including solid means for carrying lubricant from said reservoir to the interior of said bearings.

4. A pump casing having a lubricant reservoir, a shaft in said casing, bearings for said shaft at the ends of said reservoir, and means including a shaft housing cooperating with said bearings to completely enclose the shaft from the reservoir between the ends of the reservoir, said bearings including capillary means for carrying lubricant from said reservoir to the interior of said bearings.

5. A pump casing having a lubricant reservoir, a shaft in said casing, bearings for said shaft at the ends of said reservoir, means including a shaft housing cooperating with said bearings to completely enclose the shaft from the reservoir between the ends of the reservoir, bearings including capillary means for carrying lubricant from said reservoir to the interiors of said bearings, and instrumentalities cooperating with said bearings to automatically compensate for wear.

6. A pump comprising a casing having cylindrical end sections, a shaft housing spaced from and alined with said sections, bushings in said sections and bridging the spaces between the same and said housing, a compressed spring in said housing, packing means in said housing between the spring and said bushings, means for retaining said bushings in said sections, a shaft in said sections and housing and journaled in said bushings, whereby said casing is rendered substantially fluid-tight, a lubricant reservoir provided by said casing, and means for feeding lubricant from the reservoir to the journaled portions of the shaft in proportion to the requirements of said portions.

7. A pump comprising a casing having cylindrical end sections, a shaft housing spaced from and alined with said sections, bushings in said sections and bridging the spaces between the same and said housing, a compressed spring in said housing, packing means in said housing between the spring and said bushings, means for retaining said bushings in said sections, a shaft in said sections and housing and journaled in said bushings, whereby said casing is rendered substantially fluid-tight, a lubricant reservoir provided by said casing, and automatic means for feeding lubricant from the reservoir to the journaled portions of the shaft in proportion to the requirements of said portions.

8. A pump casing having a lubricant reservoir, a shaft in said casing, bearings for said shaft at the ends of said reservoir, and means including a shaft housing cooperating with said bearings to completely enclose the shaft from the reservoir between the ends of the reservoir, said bearings including solid means for carrying lubricant from said reservoir to the interior of said bearings, said solid means constituting the sole means by which communication is established between the reservoir and the shaft.

9. In a pump construction, a casing having a lubricant reservoir, an impeller shaft, bearings for said shaft, and a housing for said shaft encircling the same and cooperating with said bearings to completely enclose the shaft intermediate the ends of the reservoir, said bearings including heat responsive means for controlling the rate of feed of the lubricant from the reservoir to the interior of the bearings.

10. In a pump construction, a casing having a lubricant reservoir, an impeller shaft, bearings for said shaft, and a housing for said shaft encircling the same and cooperating with said bearings to completely enclose the shaft intermediate the ends of the reservoir, including means embedded in said bearings for controlling the rate of feed of lubricant from the reservoir to the interior of the bearings in response to temperature changes.

CARL A. RUESENBERG.